United States Patent [19]

Stahl

[11] Patent Number: 5,635,020

[45] Date of Patent: Jun. 3, 1997

[54] PLATEN ADJUST APPARATUS

[75] Inventor: Keenan W. Stahl, Glenwood City, Wis.

[73] Assignee: Doboy Packaging Machinery, Inc., New Richmond, Wis.

[21] Appl. No.: 446,541

[22] Filed: May 19, 1995

[51] Int. Cl.[6] .................................................. B30B 15/34
[52] U.S. Cl. ........................ 156/580; 156/583.5; 100/154; 425/371
[58] Field of Search .............................. 156/555, 580, 156/581, 583.1, 583.5; 100/50, 151, 154, 270, 915, 918, 93 P, 93 RP, 291, 292; 425/371

[56] References Cited

U.S. PATENT DOCUMENTS

| 664,423 | 12/1900 | McLaughlin | 100/219 |
|---|---|---|---|
| 2,256,167 | 9/1941 | Moore | 493/191 |
| 2,439,361 | 4/1948 | Gaubert | 156/552 |
| 3,654,841 | 4/1972 | Davis, Jr. | 493/190 |
| 3,935,057 | 1/1976 | Gray | 156/578 |
| 3,935,778 | 2/1976 | Pretty | 83/639 |
| 3,965,333 | 6/1976 | Elsner | 219/243 |
| 4,221,626 | 9/1980 | Clay | 156/366 |
| 4,317,697 | 3/1982 | McLean | 156/583.1 |
| 4,451,322 | 5/1984 | Dvorak | 156/461 |
| 4,472,235 | 9/1984 | Pasche et al. | 156/461 |
| 4,554,818 | 11/1985 | Kuehling | 72/410 |
| 4,557,792 | 12/1985 | Yamada et al. | 156/583.1 |
| 4,611,455 | 9/1986 | Aiuola et al. | 156/583.1 X |
| 4,650,535 | 3/1987 | Bennett et al. | 156/352 |
| 4,768,946 | 9/1988 | Maruyama et al. | 425/595 |
| 5,167,750 | 12/1992 | Myers | 156/583.9 |

*Primary Examiner*—James Sells
*Attorney, Agent, or Firm*—Haugen and Nikolai, P.A.

[57] ABSTRACT

A platen adjust apparatus for the heating, compression and cooling platens in a bag sealer assembly of a high speed bagger. The bag sealer has a plurality of platen pairs in face to face orientation with each platen pair having an adjustable platen and a stationary platen. The stationary platens are mounted to a frame and the adjustable platens are mounted to a plate. This plate is slidably mounted to the frame for movement towards and away from the stationary platens. The plate is moved towards or away from the stationary platens by a moveable wedge member until the appropriate gap between the stationary platens and the adjustable platens is achieved. The gap is adjusted simultaneously along the length of the platen pairs because the plate is moved simultaneously along its length.

20 Claims, 5 Drawing Sheets

← PRODUCT FLOW 5,635,020

PLATEN ADJUST APPARATUS

FIELD OF THE INVENTION

The present invention relates to a high speed bag sealer assembly and, more particularly, to a platen adjust apparatus for the heating, compression and cooling platens in the bag sealer assembly of a high speed bagging assembly.

BACKGROUND OF THE INVENTION

A high speed bagging assembly typically seals bags by passing the upper portion of the open bag through a series of heating, compression, and cooling platens. The heating platens melt the bag, the bag liner or a sealing tape folded over the opening to create closure of the bag. The compression platen cooperating with compression rolls compress the upper portion of the bag to further ensure closure of the bag and the cooling platens cool the heated and compressed portion of the bag.

There are typically 3–13 pairs of platens in the bag sealer portion of a high speed bagging assembly. Each platen pair is arranged in a spaced apart, face-to-face orientation. The gap located between the facing platen pairs is the area through which the upper and open portion of the bag and sealing band are routed. The gap distance between the facing platens must be adjusted to correspond to the particular bag and sealing band thickness. Each platen pair consists of a stationary platen and an adjustable platen such that the gap size is adjusted by moving the adjustable platen towards or away from the stationary platen. In the prior art, the gap size was changed by manually rotating jack screws located on each adjustable platen for moving the platen to obtain the proper distance from the stationary platen. This manual procedure is time consuming and tedious. Each time the machine is changed over for a different bag type, each individual platen pair must be adjusted for the proper gap size. Attention must be paid to ensure that each separate platen pair has the correct gap size. If there are any variations in the gap size along the length of platens, a jam could result at an area that is too narrow and ineffective sealing could result where the gap is too wide. Furthermore, set up time is slowed and more maintenance is required on the individual platens.

An additional drawback of the need to separately adjust each individual platen pair is that if a jam occurs, the specific platen or platens involved in the jam must be individually moved out of operating position. Once the platens are out of operating position, the jam can be removed. However, after the jam is removed the individual platens must be carefully readjusted to the desired gap size.

Accordingly, what is needed is a mechanism to simultaneously adjust the platens in the bag sealing portion of a high speed bagging assembly to achieve the desired gap size along the length of the platens. The present invention addresses this problem by providing a single apparatus for simultaneously adjusting the platens to obtain the desired gap size between the series of platen pairs. Furthermore, it incorporates an air actuated cylinder for simultaneously increasing the gap size between the series of platen pairs taking them out of an operating position, allowing the operators to easily clear jams.

It is accordingly a principal object of the present invention to provide an improved apparatus and method for simultaneously adjusting the gap size between pairs of heating, compression, and cooling platens used in a bag sealer assembly of a high speed bagging assembly.

Another object of the present invention is to provide a platen adjust apparatus for simultaneously and uniformly moving a series of platens to obtain a desired gap size between the platen pairs along the entire length of the series of platen pairs of the bag sealer which allows faster set up time and easier changeover for different bag configurations.

Still another object of the present invention is to provide a platen adjust apparatus which allows a quick operator response to jams along the heating, compression, and cooling platens without either the need to change the platen gap size setting or the need to adjust each individual platen pair located in the jammed area.

Yet another object of the present invention is to provide a platen adjustment apparatus where the heating, compression, and cooling platen pairs are initially and individually calibrated when installed and then the operator is able to use a single adjustment to simultaneously adjust and readjust the platens to accommodate the desired bag thickness.

SUMMARY OF THE PRESENT INVENTION

The present invention is a platen adjust apparatus for the bag sealer assembly on a high speed bagging assembly. The bag sealer assembly includes a plurality of heating, compression, and cooling platen pairs. Each platen pair is oriented face-to-face with a gap located therebetween. It is through this gap that the open bag end is routed during the sealing operation. In each platen pair, one platen is secured to a frame and remains stationary and the other platen is secured to the frame by the present invention which allows it to be moveable with respect to the other platen in order to change the gap size. Thus, the bag sealer may accommodate different bag thicknesses.

The platen adjust apparatus includes a moveable elongate plate on which is mounted the plurality of heating, compression, and cooling adjustable platens. Linkage arms extend from the moveable elongate plate to a support bar member. This support bar member is positioned parallel to and spaced apart from the elongate plate. The linkage arms are coupled to the plate, a frame and support member for pivotal movement. An adjustment block is located on the frame adjacent to at least one of the linkage arms and includes an adjustment screw, a scale indicating the platen gap size and a moveable wedge. The wedge contacts a rounded end of one of the linkage arms pivotally secured to the plate, the frame and the support bar member.

Rotation of the adjustment screw moves the wedge towards or away from the stationary platens depending upon the direction of rotation. This in turn moves the linkage arm it contacts towards the stationary platens as the wedge moves towards the stationary platens. The platen adjust apparatus is in tension so that when the wedge moves away from the stationary platens, the linkage arm follows the wedge, remaining in contact. Since the support arm is coupled to the linkage arm and the other linkage arms secured to the support arm, the plate is moved along its entire length in the direction the wedge is moved. The plate is slidably mounted to the frame by "L" shaped extensions located in the bottom of the moveable plate which ride in corresponding recesses in the frame. These slides help minimize error during travel of the moveable plate. Thus, the gap between the moveable platens and the stationary platens is adjusted by rotating the adjustment screw in the proper direction to move the wedge contacting the linkage arm which in turn moves the linkage arm, the parallel bar and the elongate plate containing the adjustable platens. The angle of the wedge contacting the linkage arm and the radius of the linkage arm rounded end are preferably configured such that ⅙th of the revolution of the adjustment of the screw changes the gap by approximately ⅟1000th.

Also mounted on the frame is a pneumatic cylinder. One of the linkage arms is pivotally coupled to the piston of the pneumatic cylinder. Actuation of the pneumatic cylinder causes the entire plate to move the adjustable platens away from the stationary platens and out of operating position. This allows jams to be cleared readily and allows access to the stationary platens for maintenance.

BRIEF DESCRIPTION OF THE DRAWINGS

The foregoing features and advantages of the invention will become apparent to those skilled in the art from the following detailed description of a preferred embodiment, especially when considered in conjunction with the accompanying drawings.

DETAILED DESCRIPTION OF THE PREFERRED EMBODIMENT

Figure 1:
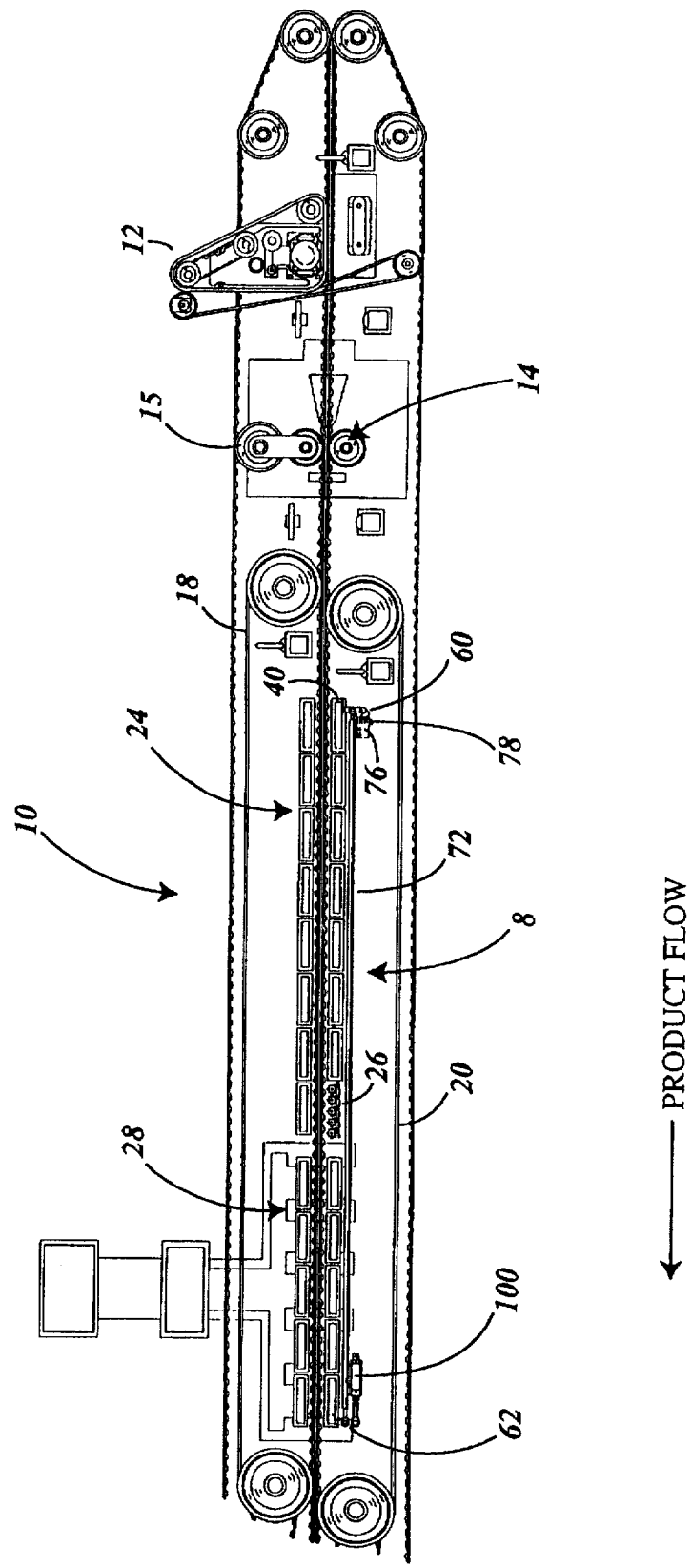
FIG. 1 is a overview of a bag sealer assembly of a high speed bagging assembly incorporating the present invention.

Referring first to FIG. 1, there is shown generally the platen adjust apparatus 8 for use with a typical bag sealer 10. The platen adjust apparatus is located at the portion of the bag sealer containing a series of heating, compression, and cooling platens designated generally as 24, 26, and 28 respectively. The details of the platen adjust apparatus 8 will be described after a brief discussion of the overall bag sealer shown in FIG. 1.

The bag sealer 10 is used in high speed production bagging assemblies where various sized bags filled with product must be sealed for shipping. The unsealed bags (not shown) are conveyed through the bag sealer 10 where the top portion of the bag is first trimmed by the bag trimmer 12 so that the bag length on each side is equal. In some applications a strip of material is applied by the tape applicator 14 to the top portion of the bag. This strip is usually about ½" and is folded over the top of the bags. The sealing tape is preferably made out of the same material as the bag. After the tape has been applied across the entire width of the top portion of the bag, a knife (not shown) separates the tape for the bag from the roll 15 of sealing tape.

Figure 2:
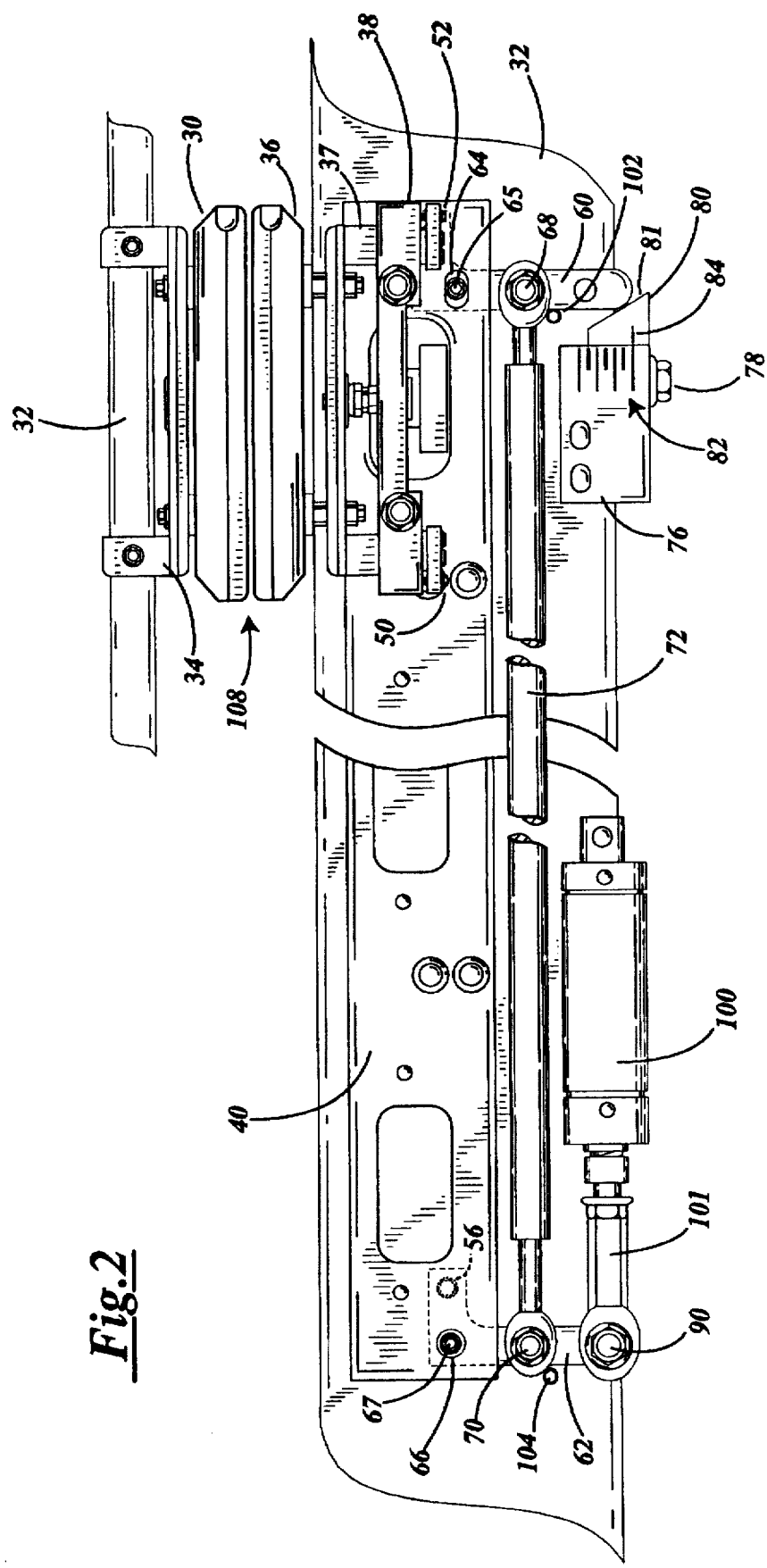
FIG. 2 is a partial top plan view of the present invention showing one platen pair.
Figure 4:
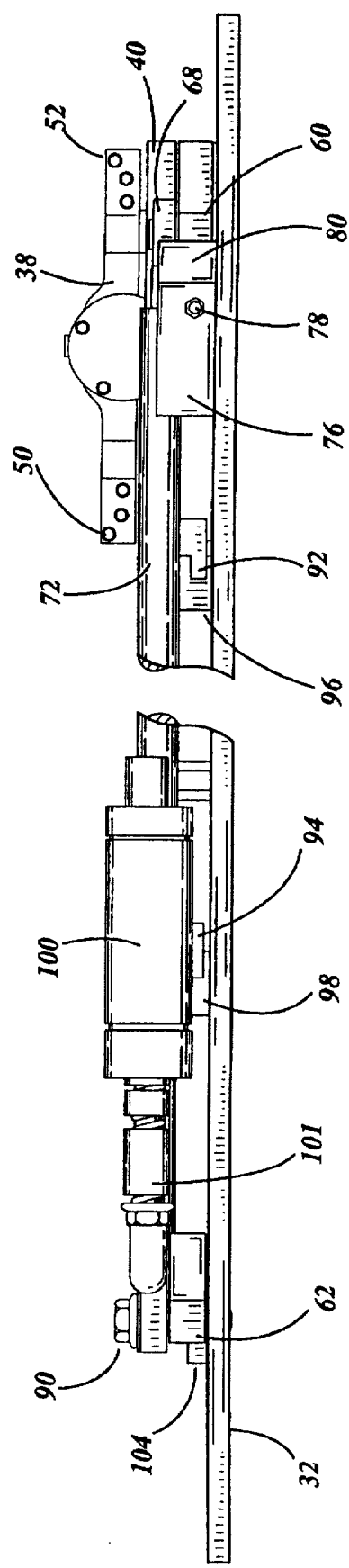
FIG. 4 is a side elevational view of FIG. 2.
Figure 5:
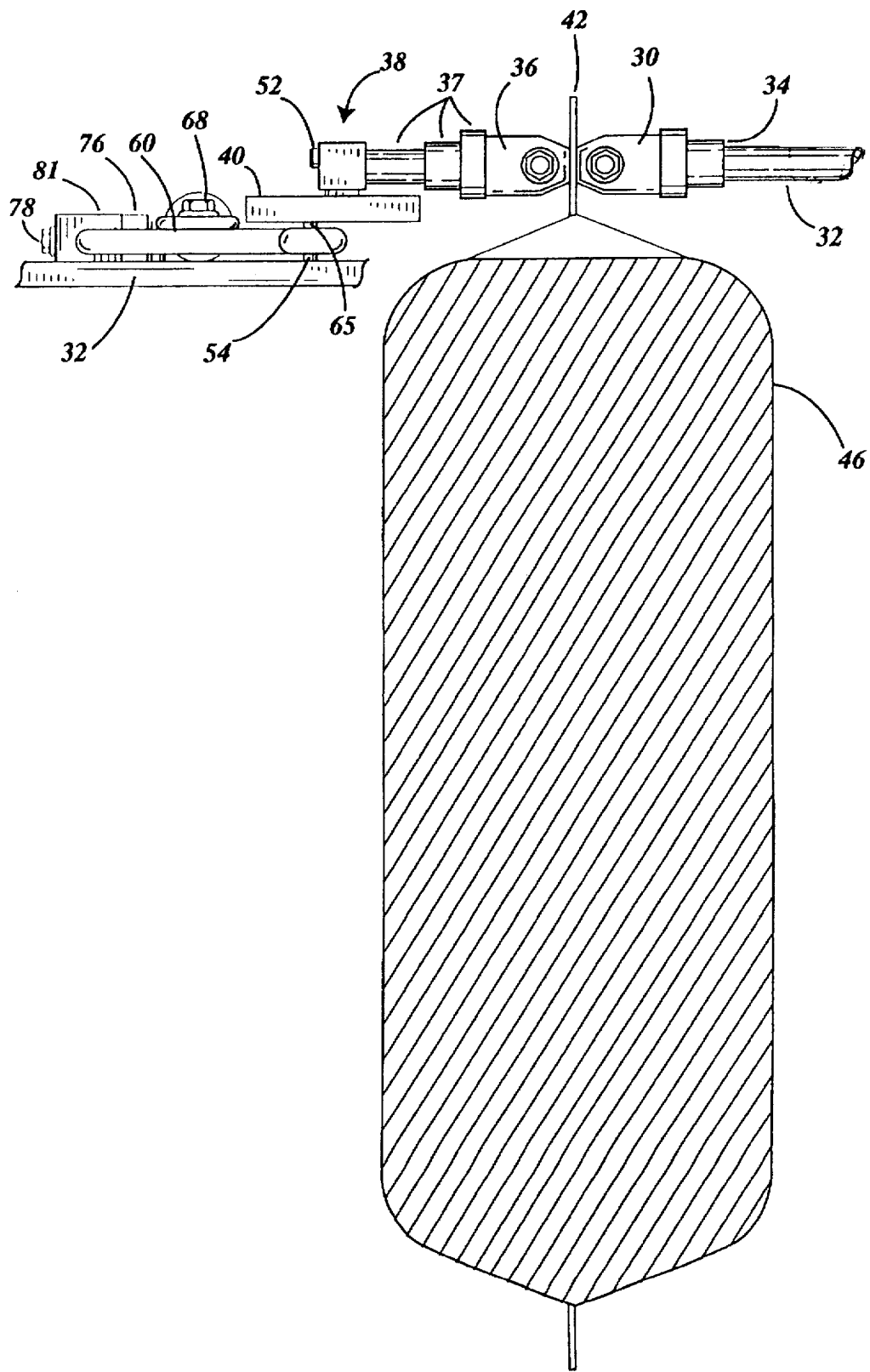
FIG. 5 is an end view of a bag in the bag sealer assembly incorporating the present invention.

After the strip of tape has been applied to the top portion of the bag, the bag is then conveyed through the bag sealer platen assembly containing the present invention by a pair of sealing bands 18 and 20 which are aligned in the same plane. The band surfaces are larger than the platen surfaces. The band surfaces are typically one inch and the platen faces are ¼ inch typically. The bag sealer platen assembly includes a plurality of heating, compression, and cooling platens pairs designated 24, 26 and 28 respectively. The heating and cooling platens provide localized heating or cooling through the bands. Each platen pair is arranged in face-to-face spaced apart relationship as shown in FIGS. 1, 2 and 5. In each pair, one platen (shown as 30 in FIGS. 2 and 5) is stationary and mounted to a bracket 34 which in turn is mounted directly to a frame 32. The other platen (shown as 36 in FIGS. 2 and 5) is adjustable and mounted to arm 37 of a bracket 38. Bracket 38 is mounted to a generally rectangular elongate plate 40 which extends the length of the heating, compression, and cooling platen pairs designated 24, 26 and 28. Elongate plate 40 is slidably mounted to the frame 32 by mounting slides 92 and 94 shown in FIG. 4. These slides are preferably L-shaped extensions 92 and 94 on lower surface of the plate. The extensions 92 and 94 are received in guides 96 and 98 located in the frame 32. These extensions 92 and 94 help ensure that plate 40 moves uniformly as it is moved towards or away from the stationary platens as will be explained later.

Turning now to FIGS. 2, 3, 4 and 5, the moveable plate 40 which carries the adjustable platens is shown in greater detail. The adjustable platen 36, which is coupled to bracket 38 mounted on the elongate plate 40, is initially and individually adjusted on the bracket 38 with jack screws 50 and 52. These jack screws 50 and 52 extend from the bracket 38 to arm 37 to which the adjustable platen 36 is secured.

Coupled to the elongate plate 40 are linkage arms 60 and 62. These linkage arms have a generally "L" shaped configuration with the short length secured to the frame 32 for pivotal movement at 54 and 56. The plate 40 is slotted, as shown at 64, allowing pin 65 of the linkage arm 60 to extend therethrough. This slot 64 compensates for the expansion or contraction of the plate 40 as it is warmed or cooled by the heating and cooling platens. Linkage arms 60 and 62 are also coupled at 68 and 70 to a support bar 72 which is positioned parallel to the moveable plate 40. Depending upon the length of the moveable plate 40, additional linkage arms such as 74 may be necessary which is also pivotally coupled to the bar 72 at 73, the frame 32 at 75 and the plate 40 with pin 77 in slot 79.

Linkage arm 60 is adjacent to and contacting a rectilinear moveable block 80 on a adjustment block member 76. This adjustment block member 76 has an adjustment screw 78 coupled to the moveable block 80. A recess is formed in the adjustment block member 76 for receiving the arm 83 shown in hidden line in FIG. 3 of the moveable block 80 and adjustment screw 78 (shown in hidden line in FIG. 3). Adjustment screw 78 extends through the wall of the adjustment block member 76 into the recess and through arm 83 into its seat 85. Rotation of the adjustment screw 78 will cause the arm 83 to move along the shank 87 of the adjustment screw. The moveable block 80 is moved along with the arm 83. The moveable block 80 has an angled edge 81 which contacts the linkage arm 60. The linkage arm 60 is rounded at the area which contacts the angled edge 81. Rotation of the adjustment screw 78 moves the moveable block 80, the linkage arm 60 and the elongate plate 40 towards and away from the stationary platens as will be described later.

A scale 82 which indicates bag thickness or the distance between the stationary platens and the adjustable platens is located on the adjustment block member 76 and a corresponding indicator mark 84 is located on the moveable block 80. The indicator line 84 on the moveable block moves along the scale 72 as the moveable block 80 is moved.

Secured to the frame 32 is an pneumatic cylinder 100 having a piston 101 pivotally coupled at 90 to linkage arm 62. The pneumatic cylinder piston 101 is extended when the bag sealer is in operation, placing the platen adjust assembly in tension. The pneumatic cylinder 100 is utilized primarily as a safety feature in the event of a jam within the series of platens. Retraction of the piston 101 causes the linkage arm 62 to move with the piston 101 bringing along with it the support bar 72. Linkage arm 60 and any intermediate linkage arms also move. Elongate plate 40 moves away from the stationary platens and into a nonoperative position shown in FIG. 3. This allows any jam to be quickly removed. Turning now to FIGS. 2-5, the operation of the platen adjust apparatus will be discussed. First, the apparatus must be initially calibrated. The moveable block 80 is backed out by turning screw 78. The plate 40 is then moved so that linkage arms 60 and 62 meet the stops 102 and 104. The adjustment screw 78 is rotated to bring the moveable block 80 in until the indicator line 84 is lined up with 0.00 on the scale 72. The adjustment block 76 is then slid until moveable block member 80 is just touching linkage arm 60 and capscrews 106 and 108 are tightened on block 76. Air pressure is applied to the pneumatic cylinder 100, extending piston 101 and pushing the bar 40 into sealing position. The platens are then initially set on the brackets with their respective jack screws. Once the spacing has been set properly, taking into account the band thickness, the spacing between the platens can be changed by simply turning adjustment screw 78 to align the indicator mark 84 to the desired mark on scale 82.

The bag thickness or gap size for the products to be conveyed through the bag sealer is determined and the adjustment screw 78 is rotated in the proper direction to move moveable block 80 until the indicator 84 is aligned with the desired bag thickness marking on scale 82. As moveable block 80 moves it results in linkage arm 60 moving in the same direction. When the moveable block moves towards the stationary platens, it pushes linkage arm 60 in the same direction. When the moveable block 80 moves away from the stationary platens, the linkage arm 60 follows and remains in contact because the platen adjust apparatus is in tension. Movement of the linkage arm 60 results in movement of the entire support bar 72 and the movement of the plate 40. Linkage arm 62 and any intermediate linkage arms such as 74 are moved as the support arm 72 moves. Thus, the gap designated as number 108 will alter accordingly. Because the bar member 72 extends the length of the elongate plate 40 and the other linkage arms are secured thereto, all moveable platens are simultaneously adjusted to the desired gap size along the heating, compression and cooling station. The extensions 92 and 94 follow guides 96 and 98 and help ensure that the plate 40 moves uniformly along its entire length.

The indicator mark 84 on the moveable block 80 and the scale 82 on the adjustment block 76 are calibrated to correspond to the gap size between the adjustable platens and the stationary platens. The moveable block 80 and the linkage arm 60 are arranged such that a constant and uniform change in gap size will result as the block 80 is moved. In particular, the angle of edge 81 of the moveable block 80 and the radius on the end of the linkage arm 60 are preferably configured such that ⅙th of a revolution of the adjustment screw moves the moveable block 80 with respect to the linkage arm 60 such that the gap 108 changes by approximately ¹⁄₁₀₀₀th. A different angle and radius may be easily chosen for a different change of the gap size upon a specific rotation of the adjustment screw 78.

Once the gap 108 is at the desired width, bags may be sent through assembly. FIG. 5 shows side elevational view of bag 46 going through one of the platen pairs for sealing. Turning to both FIGS. 1 and 5, the heating platens 24 heat and melt the bag 46 at a localized point 42 at the top portion of the bag 46. The bag 46 then passes through the compression platen 26 with corresponding compression rollers for compressing the bag top. The bag 46 then passes through the cooling platens 28 which solidify the top portion of the bag. The sealed bag is then conveyed out of the bag sealer 10.

When a different bag size is to be routed through the bag sealer, the platens must be adjusted for the required gap size. The adjustment screw 78 is rotated in the appropriate direction until the indicator mark 84 is aligned with the appropriate scale marking on scale 82. As the adjustment screw 78 is rotated, the adjustable platens are moved with respect to the stationary platens as described above until the gap size indicated on the scale 82 is reached. The bag sealer is ready for the new bags to be routed through.

Figure 3:
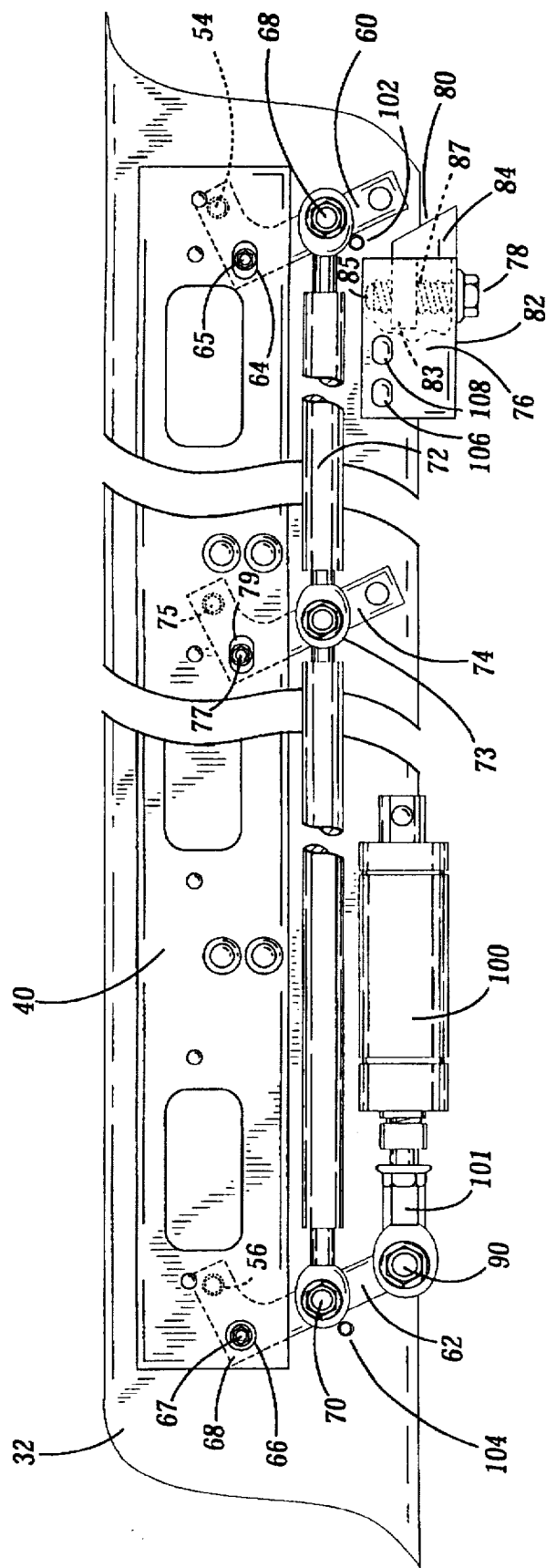
FIG. 3 is a top elevation view of the plate and linkage apparatus of the present invention shown in a nonoperative position.

In the event a jam occurs, the piston 101 of the pneumatic cylinder 100 is retracted to move the support bar 72, the plate 40 and all the adjustable platens away from the stationary platens to the position shown in FIG. 3. The jam may be quickly cleared and then the piston 101 is extended simultaneously placing the adjustable platens at the appropriate distance from the stationary platens for the desired gap size. There is no need to readjust each platen pair. The platens will return to the position corresponding to the gap size to which the indicator mark 84 is aligned with on the scale 82. Additionally, when the platens are in the operating position shown in figures 1, 2, 4 and 5, the pneumatic cylinder is extended and the platen adjust apparatus is in tension. Having the system in tension results in minimizing travel errors when the apparatus is operated.

This invention has been described herein in considerable detail in order to comply with the patent statutes and to provide those skilled in the art with the information needed to apply the novel principles and to construct and use such specialized components as required. However, it is to be understood that the invention can be carried out by specifically different equipment and devices and various modifications both as to equipment details and operating procedures without departing from the scope of the invention itself.

What is claimed:

1. A platen adjust apparatus for use in a band sealer assembly of a high speed bagging machine, the band sealer assembly having a frame and a series of platen pairs oriented in face-to-face relations with a set gap therebetween, said platen adjust apparatus comprising:
   a) a plate mounted to said frame for movement thereon, a first platen of each said platen pair mounted on said plate and a second platen of each said platen pair mounted on said frame opposite said plate; and
   b) an adjustment block mounted on said frame adjacent said plate, said adjustment block having means for moving said plate to a predetermined position to obtain a predetermined uniform gap size for said gap between said first and second platens of said series of platen pairs.

2. A platen adjust apparatus of claim 1 wherein said means for moving said plate comprises a moveable block member contacting said plate and a screw operably connected to said moveable block member whereby rotation of said screw moves said moveable block member and said plate towards or away from said second platen of each said platen pairs.

3. A platen adjust apparatus of claim 2 and further including a gap size indicating scale on said adjustment block and a corresponding indicator mark on said moveable block member for aligning with said gap size indicating scale.

4. A platen adjust apparatus for use in a high speed bagging machine incorporating a frame with a plurality of platen pairs arranged in face-to-face orientation with a predetermined set gap therebetween, said platen adjust apparatus comprising:
   a) a plate having a first platen of each said platen pair stationarily mounted thereon, said plate mounted to said frame for movement thereon;

b) a support bar located adjacent said plate in a spaced apart parallel relationship thereto;

c) a plurality of linkage arms extending from said plate and coupled to said support bar; and d) means for moving said plate to a predetermined position with a predetermined uniform gap size between said first and second platens of said series of platen pairs with respect to a second platen of each said platen pair, said second platen of each said platen pair stationarily mounted to said frame opposite said plate.

5. A platen adjust apparatus of claim 4 and further including a pneumatic cylinder mounted on said frame adjacent said support bar and coupled to a linkage arm of said plurality of linkage arms.

6. A platen adjust apparatus of claim 4 wherein said means for moving said plate includes an angled member contacting said plate and an adjustment screw whereby rotation of said adjustment screw moves said angled member with respect to said plate.

7. A platen adjust apparatus of claim 4 wherein said plurality plate.

8. A platen adjust apparatus of claim 5 wherein said pneumatic cylinder has a piston that is extended when said platen adjust apparatus is in an operating position and is retracted when said platen adjust apparatus is in a nonoperating position.

9. A platen adjust apparatus of claim 6 wherein said angled said angled member contacts a linkage arm of said plurality of linkage arms.

10. A platen adjust apparatus of claim 9 wherein said linkage arm of said plurality of linkage arms has a rounded edge for contacting said angled member.

11. A platen adjust apparatus of claim 6 and further including a stationary block member adjacent said angled member, said stationary block member having a scale indicating gap size between said first and second platens of said platen pairs and an indicator mark on said wedge member whereby desired gap size is obtained by moving said indicator mark to an appropriate position on said scale.

12. A platen adjust apparatus for use in a band sealer of a high speed bagging machine, the machine incorporating a frame with a plurality of spaced apart platen pairs stationarily mounted in face-to-face orientation with a gap therebetween, said platen adjust apparatus comprising:

a) an elongate plate having a first platen of each said platen pairs stationarily mounted thereon, said elongate plate mounted to said frame for movement thereon;

b) a support bar extending along a length of said plate in a spaced apart parallel relationship to said plate;

c) a plurality of linkage arms interconnecting said plate and said support bar;

d) a moveable wedge member contacting one of said plurality of linkage arms; and e) a pneumatic cylinder mounted on said frame and linked to said support bar for selectively positioning said plate in an operating position and a nonoperating position.

13. A platen apparatus of claim 12 and further including an adjustment screw operably connected to said moveable member whereby rotation of said adjustment screw moves said moveable member with respect to said frame.

14. A platen adjust apparatus of claim 12 wherein said plurality of linkage arms are pivotally secured to said elongate plate and said support bar.

15. A platen adjust apparatus of claim 12 wherein said pneumatic cylinder is operably connected to a linkage arm of said plurality of linkage arms.

16. A platen adjust apparatus of claim 12 wherein said moveable member contacts a linkage arm of said plurality of linkage arms.

17. A platen adjust apparatus or claim 16 wherein said linkage arm of said plurality of linkage arm has a rounded edge for contacting said wedge member.

18. A platen adjust of claim 12 and further including a scale having markings indicating gap size of said gap between said first and second platens of said platen pairs and an indicator mark on said wedge member, whereby desired gap size is obtained when moving said indicator mark to an appropriate scale marking on said scale.

19. A platen adjust apparatus of claim 12 wherein retraction of a piston of said pneumatic cylinder causes said support bar and said plate to move out of an operating position.

20. A platen adjust apparatus of claim 12 and further including a plurality of protrusions on said plate, said plurality of protrusions received by corresponding recesses in said frame.

* * * * *

UNITED STATES PATENT AND TRADEMARK OFFICE
CERTIFICATE OF CORRECTION

PATENT NO. : 5,635,020
DATED : June 3, 1997
INVENTOR(S) : Keenan W. Stahl

It is certified that error appears in the above-indentified patent and that said Letters Patent is hereby corrected as shown below:

Column 7, line 21, after the word "plurality" please insert -- of linkage arms are pivotally coupled to said --;

Column 7, lines 27-28, after the word "wherein" please delete the words "said angled";

Column 8, line 13, after the word "platen" please insert -- adjust --;

Column 8, line 26, delete the word "or" and replace it with -- of --;

Column 8, line 29, after the word "adjust" please insert -- apparatus --.

Signed and Sealed this

Twenty-third Day of September, 1997

Attest:

BRUCE LEHMAN

Attesting Officer

Commissioner of Patents and Trademarks